May 28, 1968   E. E. PETTERSSON   3,385,742
METHOD AND APPARATUS FOR FASTENING ANTI-SKID SPIKES IN TIRES
Filed Dec. 20, 1963   2 Sheets-Sheet 1

INVENTOR.
Erik Elias Pettersson
BY
Cushman, Darby & Cushman
Attorneys

May 28, 1968 E. E. PETTERSSON 3,385,742

METHOD AND APPARATUS FOR FASTENING ANTI-SKID SPIKES IN TIRES

Filed Dec. 20, 1963 2 Sheets-Sheet 2

INVENTOR.
Erik Elias Pettersson
BY
Cushman, Darby & Cushman
Attorneys

United States Patent Office 3,385,742
Patented May 28, 1968

3,385,742
METHOD AND APPARATUS FOR FASTENING ANTI-SKID SPIKES IN TIRES
Erik Elias Pettersson, Linkoping, Sweden, assignor to Stora Kopparbergs Bergslags Aktiebolag, Falun, and Sandviken Jernverks Aktiebolag, Sandviken, Sweden
Filed Dec. 20, 1963, Ser. No. 332,209
Claims priority, application Sweden, Dec. 22, 1962, 13,944/62
8 Claims. (Cl. 156—114)

ABSTRACT OF THE DISCLOSURE

The method and tool for inserting an anti-skid spike in rubber tires, for which uniform diameter holes has been provided, the tool being provided with fingers which on insertion in the holes are limited in depth of penetration by the outside shape of the fingers bearing on the outside of the holes. The fingers spread open the hole to receive from a magazine a spike which is forced by a plunger down between the fingers into the hole. Said spike is maintained in the hole by the plunger while the fingers are withdrawn.

---

The present invention relates to a method and an apparatus for fastening anti-skid spikes in tires.

It is known to provide motor vehicle tires of elastic material with anti-skidding means in the form of stud-like members referred to as spikes, which are anchored in the tire and have an end projecting beyond the periphery of the tire to prevent slippage on for example ice.

The application of such spikes may be made in connection with mass production of tires which requires relatively expensive machines. However, the spikes may also be mounted in the tires in small work shops and in this case the application of the spikes has hitherto been a relatively difficult and time consuming work.

By means of a hammer or other striking device the spikes are driven with high axial pressure into the material of the tire or into predrilled holes. However, it is difficult to prevent the spikes during these conditions from taking an inaccurate position in the tire.

The general object of this invention is therefore to provide a simple method for inserting the spikes into predrilled holes in a tire by means of relatively small axial forces on the spike and with accuracy at a relatively high speed.

Another object of the invention is to provide a simple apparatus for positioning the spikes in drilled holes in the tire in accordance with the new method.

According to the invention a number of jaw fingers are in a closed position inserted into a drilled hole in the tire. Thereafter, the closed fingers are spread apart to expand the wall of the drilled hole for receiving and positioning a spike between the fingers and within the hole. Finally, the fingers are withdrawn from the hole, permitting the wall of the hole to contract to its original shape and thereby firmly grip the spike to safely anchor the same in a correct position.

The spikes used in connection with the invention generally have a cylindrical shank and a head at the end located at the bottom of the hole of the tire. The shank may be provided with one or more flanges to improve the anchoring in the hole. It is understood that the jaw fingers will press more or less against the head of the spike. To prevent damages to the spike head if this would not be able to stand high radial pressure from the jaw fingers due to the compressive forces from the wall of the hole the jaw fingers are preferably spread apart by means of any suitable power means before inserting the spike between the fingers. However, in other applications, the spike may be forced with its head against the jaw fingers to separate them for expanding the tire hole to an extent permitting the spike to be driven into its predetermined position in the hole of the tire.

These and other objects will be disclosed more in detail in the following description of a suitable embodiment of an apparatus for employing the principles of the invention, shown by way of example in the accompanying drawings.

Figure 1:
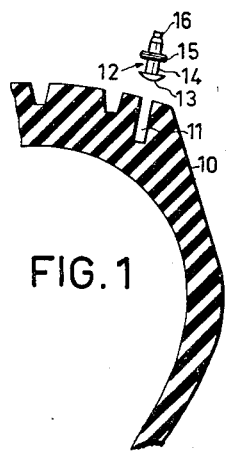
FIGURE 1 is a partial section of a tire having a drilled hole into which the spike, shown at some distance from the hole, is to be inserted.

In the drawings, reference numeral 10 denotes a tire of elastic material having a hole 11 drilled therein to a depth which is somewhat less than the length of the spike 12 to be inserted therein. In the example shown, the spike has a head 13, a shank 14, a flange 15 and an end 16 adapted to project beyond the periphery of the tire, and forms an anti-skid member. The diameter of hole 11 is less than the diameter of the head 13 of the spike 12 and in the example shown, also less than the diameter of the shank 14 of the spike 12.

Figure 2:
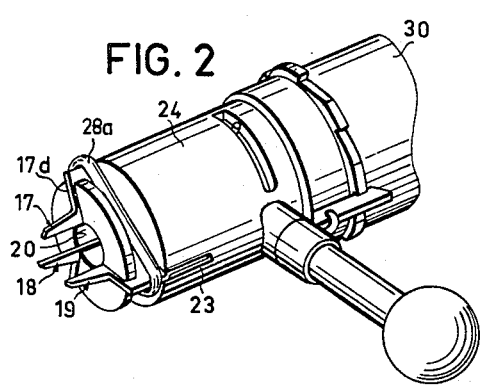
FIGURE 2 is a diagrammatic perspective view of the forward end of an apparatus according to the invention for inserting spikes into drilled holes in the tire.
Figure 3:
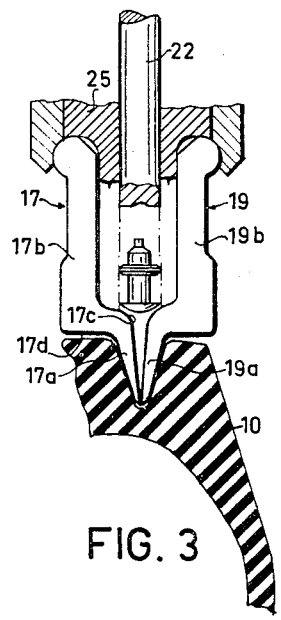
FIGURES 3, 4 and 5 are diagrammatic views of two jaw fingers, in different positions during the process of inserting the spike into the hole of the tire.
Figure 4:
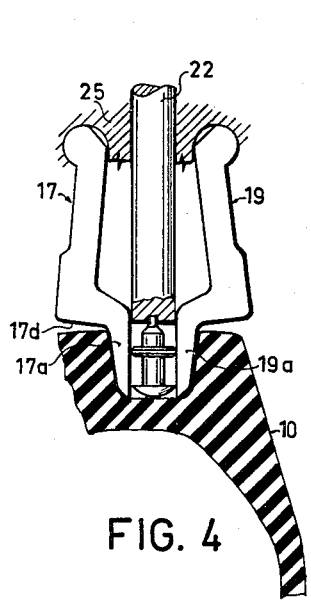
Figure 5:
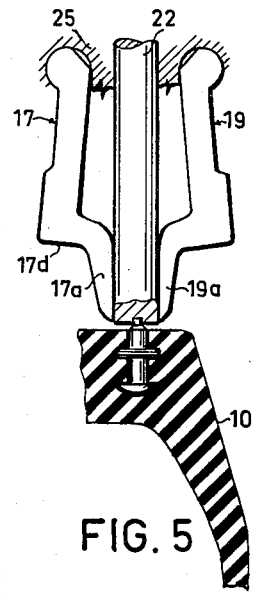
Figure 6:
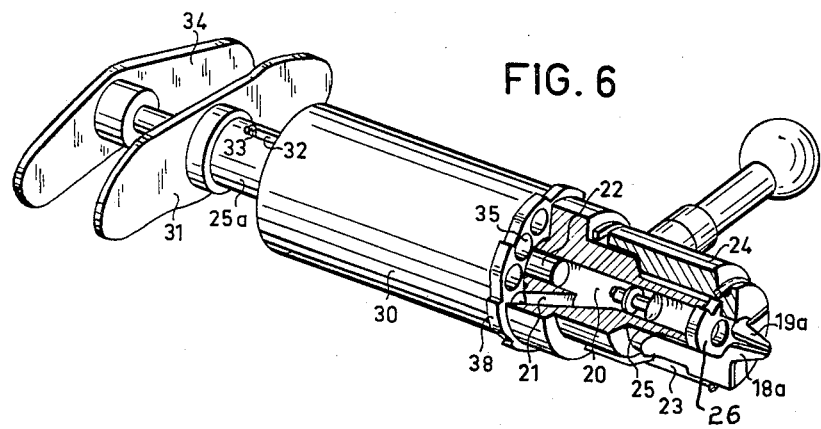
FIGURE 6 is a partly broken diagrammatic perspective view of the entire apparatus shown partly in FIG. 2.
Figure 7:
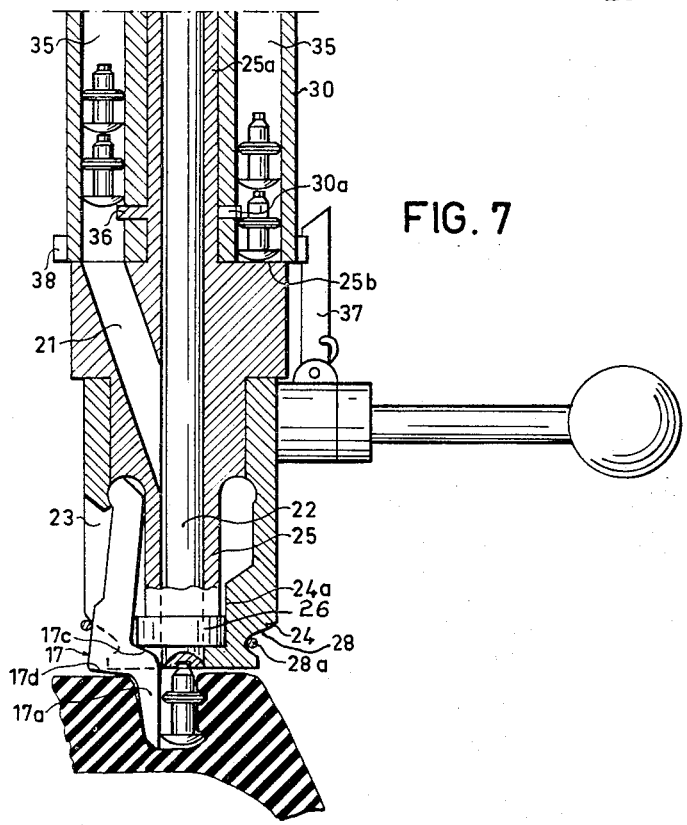
FIGURE 7 is an axial section of the forward end of the apparatus shown in FIG. 6.

The apparatus shown in FIGS. 2, 6 and 7 forms a body which at its forward end has three radially movable jaw fingers 17, 18, 19 which may be moved between a closed position shown in FIGS. 3 and 6, and an open position shown in FIGS. 2, 4, 5 and 7.

In FIGS. 3 to 5 the fingers 17 and 19 are shown in a position opposite each other for the purpose of facilitating the understanding of their operation.

The free end portions 17a, 18a, 19a of the fingers are located axially ahead of the end of a bore 20 into which the spikes are moved one by one through a feeder channel 21 (FIGS. 6 and 7). In the bore 20 is an axially movable plunger 22 which may be actuated to push the spike into a position between the finger end portions 17a, 18a, 19a as shown in FIG. 4.

The inner ends of the fingers 17, 18, 19 are pivotally and detachably mounted in the apparatus, as shown in FIGS. 6 and 7 and described below, and are movable in radial slots 23 in a chuck head 24, concentric with and rotatable relative to the sleeve 25 having the bore 20.

The forward end of the sleeve 25 is provided with a cam member 26 having three cam segments corresponding to respective fingers. The cam member 26 is rotatable with sleeve 25 in a bore 24a of the chuck head and cooperates with the inner edges of the fingers 17, 18, 19 to swing them to their open position or permit them to return to the closed position under the influence of an elastic ring 28a located in a circumferential groove 28 in the end of the head 24, and engaging the outer edges of the fingers as shown in FIGS. 2 and 7.

As shown in FIGS. 3, 6 and 7 the fingers have their free end portions offset relative to the lever arm portion 17b, 18b, 19b to form rounded shoulders 17c, 18c, 19c therebetween. These shoulders form an oblique abutment for the head 13 of the spike so that when the spike is pressed against the sloping shoulders of the inner edges of the jaw fingers, they will be forced radially outwardly and open gradually when the spike head is sliding along the fingers into its bottom position in the hole between the end portions of the fingers as shown in FIG. 4.

As understood from the above, the displacement of the spike from the position in FIG. 3 to the position in FIG. 4, may be effected exclusively by actuating the push rod, that is without the assistance of the cam segments.

However, for separating the fingers by means of the cam segments, the cam member 26 is rotated by rotating sleeve 25 relative to the chuck head 24, the latter being held against rotation by means of a handle 29 secured to the head 24.

The sleeve 25 has a rear portion 25a extending coaxially through a central bore in a revolver magazine 30 and extends freely at the rear end thereof. The rear end of the sleeve 25a has a handle 31.

The plunger also extends through the sleeve 25, 25a and has its rear end projecting outside the rear end of the sleeve. The sleeve 25a has an axial slot 32 in which a pin 33 secured to the plunger is slidable and prevents relative rotation between the sleeve and the plunger. The rear end of the plunger has a handle 34.

For actuating the cam member 26, the handles 31, 34 are rotated whereas handle 29 is held still. Accordingly, the cam member 26 will rotate relative to the head 24 and the fingers 17, 18, 19 so that the cam member will urge the fingers outwardly in the slots 23 and the free end portions 17a, 18a, 19a of the fingers located in the hole 11 will expand the wall of the hole and leave space for moving the spike by means of the plunger to a position between the end portions of the fingers as shown in FIG. 4.

Thereafter, it is preferred to maintain the plunger in contact with the spike in the hole when withdrawing the end portions of the fingers to the position shown in FIG. 5.

The revolver magazine 30 is a cylindrical body having a number of cylindrical axial channels 35 equally spaced circumferentially and adapted to register one by one with the opening of the feeder channel 21 to release the lowermost spike in the staple of spikes in the respective pocket. The sleeve 25 has a radial projection 36 moving in an annular groove in the inner wall of the magazine and this projection will always be located above the mouth of the feeder channel at a height which is lower than the length of the spike. The bottom spikes in each pocket rest on a shoulder 25b of the sleeve 25 and when they register with the feeder channel 21, the projection 36 will form a lock for those spikes located above the bottom spike which will be free to slide down into the feeder channel as shown in the left magazine channel 35 in FIG. 7.

For supplying a further spike to the feeder channel 21 the magazine is revolved one step by rotating the head 24 relative to the sleeve 25. A spring actuated latch 37 pivoted on the handle 29 will then cooperate with a ratchet 38 on the magazine 30 to rotate the magazine.

It is to be noted that the apparatus preferably is formed with an abutment at its forward end provided to rest against the tire and limit the axial movement of the end portions of the fingers into the hole, so that the finger points will be located at the bottom of the hole. In the example shown, the fingers are formed with shoulders 17d at their outer edges to provide such abutment.

What is claimed is:

1. A method of inserting an anti-skid spike with an enlarged head into a tire of elastic material, said method comprising forming in said tire, a hole of substantially uniform diameter and of a predetermined depth which is less than the thickness of the tire, inserting a number of fingers into said hole to a preestablished depth therein as limited by contact of the fingers with the tire outside said hole, radially spreading apart said fingers to uniformly expand said hole throughout its entire depth and form a space within said fingers, axially moving said spike head first into position in said space between the spread fingers with a plunger, maintaining said plunger in contact with said spike and simultaneously withdrawing said fingers from said hole, the plunger preventing withdrawal of the spike from the hole.

2. Apparatus for inserting an anti-skid spike with an enlarged head into a hole of predetermined depth in a tire of elastic material, said apparatus comprising a body having forward and rearward ends, said body being provided with an axial bore, which opens externally at said forward end, means for feeding a spike into said bore from a rearwards location therein with its head facing forwardly, a plunger supported in said bore for axial movement for urging said spike from said bore, a plurality of fingers surrounding said bore and hingeably supported on said body, said fingers including free end portions extending beyond the body axially thereof, said free end portions of the fingers being adapted for entering a hole in th etire and for widening said hole by outward pivotal movement of the fingers, and means for engaging the tire around said hole to limit the degree of entry of the end portions of the fingers into the hole, said end portions having a length related to the deptth of the hole such that with the latter said means in engagement with the tire, the lowermost ends of the finger end portions do not contact the tire at the bottom of the hole.

3. Apparatus as claimed in claim 2 comprising resilient means engaging the fingers to urge the same inwardly.

4. Apparatus as claimed in claim 3 wherein said fingers have internal radial shoulders located in the path of axial movement of the spike, said fingers being pivotably moved outwards against the action of said resilient means by axial movement of the plunger which urges the head of the spike against the shoulders of the fingers.

5. Apparatus as claimed in claim 2 wherein said plunger is rotatable in said bore, said apparatus further comprising cam means in said plunger for urging the fingers outwardly against the action of the resilient means as the plunger is rotated in said bore.

6. Apparatus as claimed in claim 1 wherein said means for feeding a spike into said bore comprises a magazine rotatably on said body having a plurality of annularly arranged axial chambers each adapted for containing a plurality of spikes in end-to-end relation, said body having a feeder channel opening into said bore at said rearwards location where the spikes are fed into said bore, said chambers being in selective communication with the feeder channel by rotation of the magazine on the body, and means for releasing the lowermost spike in a chamber as the magazine is rotated whereby when a chamber communicates with the feeder channel such spike falls freely thereinto.

7. Apparatus as claimed in claim 2 wherein said resilient means is an elastic ring surrounding the fingers and in contact therewith, said body having a circumferential groove into which the elastic ring is received when the fingers are pivotally moved inwards.

8. Apparatus as claimed in claim 1 wherein said means which limits the entry of the end portions of the fingers into the hole is constituted by shoulders formed on said fingers, said end portions of the fingers being tapered in narrowing fashion away from said shoulders.

References Cited

UNITED STATES PATENTS

| | | | |
|---|---|---|---|
| 550,560 | 11/1895 | Myers | 29—212 |
| 689,121 | 12/1901 | Piquet | 156—97 X |
| 1,129,672 | 2/1915 | Harris | 152—210 |
| 1,948,311 | 2/1934 | Orr | 156—114 |
| 2,704,564 | 3/1955 | Christensen | 152—210 |
| 2,931,261 | 4/1960 | Crandall | 81—15.7 |
| 3,125,147 | 3/1964 | Hakka | 152—210 |
| 3,186,466 | 6/1965 | Keinanen | 152—210 |
| 3,199,184 | 8/1965 | Harris et al. | 29—429 |
| 3,258,835 | 7/1966 | Boggild et al. | 29—212 |

FOREIGN PATENTS

| | | |
|---|---|---|
| 215,719 | 10/1956 | Australia. |

EARL M. BERGERT, *Primary Examiner.*

CLIFTON B. COSBY, *Examiner.*